Patented Sept. 25, 1951

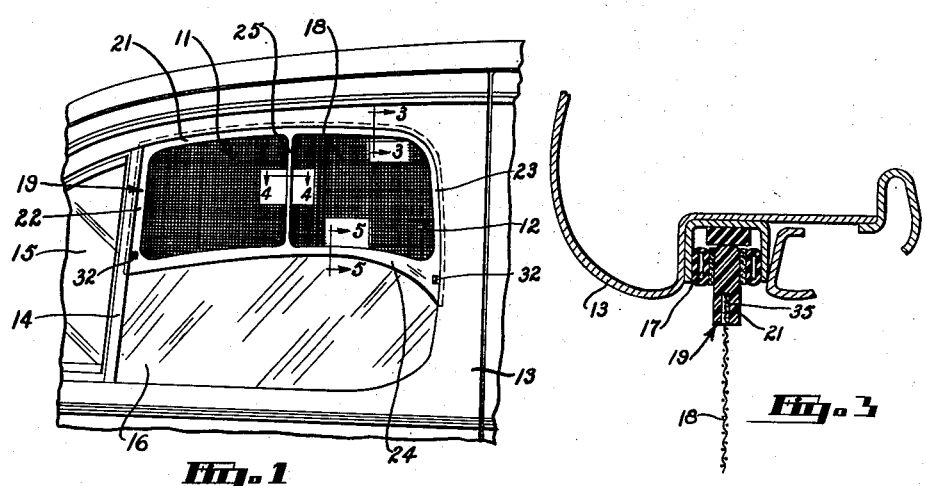
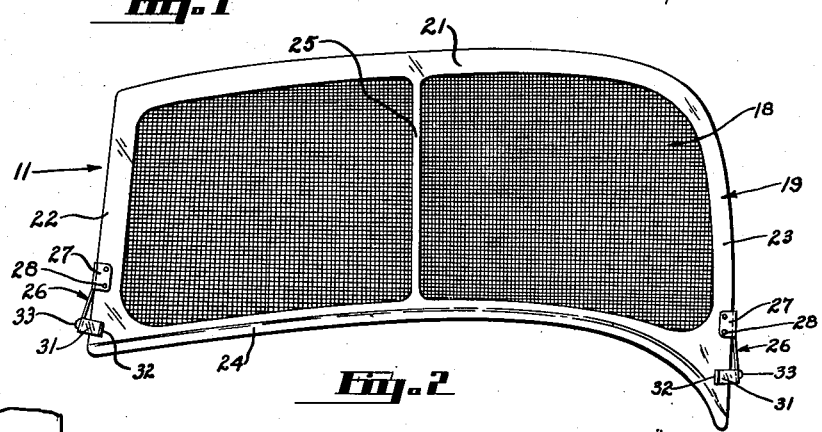
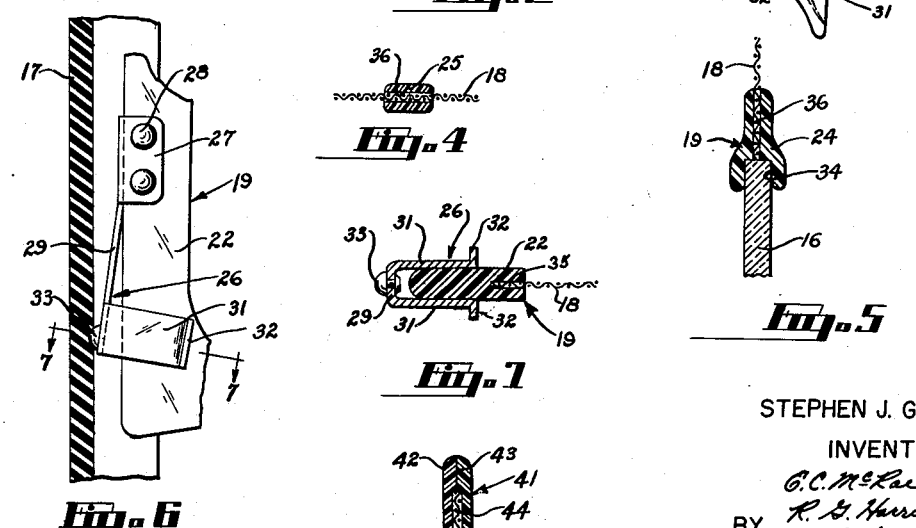
Sept. 25, 1951 — S. J. GALLA — 2,568,800
VEHICLE WINDOW SCREEN
Filed April 5, 1946
STEPHEN J. GALLA
INVENTOR.

2,568,800

UNITED STATES PATENT OFFICE 2,568,800

VEHICLE WINDOW SCREEN

Stephen J. Galla, Detroit, Mich., assignor to Ford Motor Company, Dearborn, Mich., a corporation of Delaware Application April 5, 1946, Serial No. 659,793

1 Claim. (Cl. 160—105)

This invention relates generally to a removable window screen for automotive vehicles.

In recent years there has been an increasingly greater demand from the buying public for accessories and refinements in automotive vehicles which contribute to the comfort and pleasure of driving. The present invention satisfies a certain phase of this demand by providing a removable window screen for the window opening of a vehicle. The screen is adapted to be sold as an accessory, and is particularly desirable for use in connection with vehicles equipped with convertible seats which may be changed into a bed, permitting the car to be used for sleeping purposes during trips. When using such a car for sleeping purposes, it is essential to be able to provide adequate ventilation without admitting flies, mosquitoes and other insects to the interior of the vehicle. The demand for a practical window screen for a vehicle, however, is not limited to this particular type of car, but extends into ordinary car operation since many drivers and passengers desire the comfort of screened ventilation while driving.

The window screen of the present invention has many advantages over previous types of screens. It is formed with a plastic frame, which not only adds to the attractive appearance and lightness of the screen, but renders the unit rustproof and unbreakable. The latter features facilitate the storing of the screen when not in actual use. In addition, the screen is adapted to be slideably inserted into the glass run conventionally provided in the window frame, thus providing a firm mounting for the screen as distinguished from the usual insecure and fragile arrangements for fastening a screen to a vehicle window. This stable mounting, and the superior seal resulting therefrom, partially results from making the overall width of the screen between the front and rear edges thereof somewhat wider than the width of the window opening, so that when assembled the marginal edges of the screen frame extend a short distance into the glass run surrounding the window opening. Insertion of this wider screen into the window opening is rendered possible by the flexibility of the plastic frame, which permits the screen to be bent during installation.

Still other objects of the invention include providing a window screen which is interchangeable and can be used with the corresponding window at the opposite side of the car, and which screens the upper portion of the window opening so that the lower portion of the window may be opened for signalling purposes. To this end the lower edge of the screen frame is shaped to correspond to the upper edge of the window glass and is formed to interlock therewith to prevent lateral displacement of the screen when the window is raised. In addition, means are provided, in the form of resilient metallic clips, to hold the screen in place in the upper portion of the window opening and to prevent it from moving downwardly when the window is opened.

Besides the advantages mentioned above, the window screen is easily and inexpensively manufactured, and thus can be offered for sale at an attractive price. Other objects and advantages of this invention will be made more apparent as this description proceeds, particularly when considered in connection with the accompanying drawings, in which:

Figure 1 is a fragmentary side elevation of a vehicle, showing the front door thereof equipped with a window screen embodying the present invention.

Figure 2 is an enlarged elevation of the window screen removed from the vehicle.

Figures 3, 4 and 5 are enlarged cross sectional views taken substantially on the planes indicated by the lines 3—3, 4—4 and 5—5 of Figure 1.

Figure 6 is an enlarged fragmentary side elevation, partly broken away, similar to a portion of Figure 1 and showing the screen frame and a metallic clip in engagement with the glass run.

Figure 7 is a cross section taken substantially on the line 7—7 of Figure 6.

Figure 8 is a fragmentary cross section through the frame of a modification.

Referring now more particularly to the drawings, there is shown in Figure 1 a window screen 11 designed to screen the upper portion of the window opening 12 formed in the front door 13. As is customary, the window opening 12 is divided by a vertical bar 14 into two sections, with the forward section being closed by a pivoted window 15 and the rearward area by a slideable window glass 16. The window glass is reciprocable vertically within a glass run 17 installed in the door frame and the vertical bar around the margin of the window opening.

As best seen in Figure 2, the window screen 11 comprises screen material 18 supported within a window frame 19, preferably formed of a plastic such as methyl methacrylate. The frame 19 includes a top section 21, sides 22 and 23, bottom 24, and a dividing strip 25. The outside contours of the top 21 and the sides 22 and 23 conform with the shape of the corresponding upper portion of the window opening 12, but attention is directed to the fact that the overall width of the screen 11, that is, the distance between the sides 22 and 23, is somewhat greater than the width of the window opening. Inasmuch as the frame of the window screen is relatively thin, and is formed of plastic, it is flexible and the entire screen can be readily bent to enable it to be inserted into the window opening. The thickness of the top and sides of the frame corresponds generally to the thickness of the window glass 16, and consequently the frame is readily slideable within the glass run 17. As best seen in Figure 1, in which the outline of the window screen frame is shown in dotted lines, the marginal edges of the frame extend a sufficient distance into the glass run 17 to firmly mount the screen therein and prevent lateral displacement.

A pair of resilient metallic clips 26 are provided upon the screen frame and serve to releasably support the screen in the glass run and prevent the screen from slipping downwardly therein when the window glass is lowered. The clips thus not only temporarily support the screen after it has initially been inserted in the window opening and before the window glass is raised, but also enable the window glass to be lowered to permit signalling and the like without having the screen drop downwardly. Figures 6 and 7 best show the construction of the clips 26. The upper portion of each clip is formed with a pair of spaced flanges 27 which embrace the front side 22 of the screen frame, being secured thereto by rivets 28. The body portion 29 of the clip comprises a resilient strip approximately equal in width to the thickness of the screen frame and formed at its lower end with a pair of rearwardly extending flanges 31 on opposite sides of the screen frame. Each of the lower flanges 31 terminates in an outwardly extending tab 32. Inasmuch as the clips 26 are mounted upon the frame near the lower edge thereof, the tabs 32 can readily be grasped between the thumb and forefinger for manipulation when inserting or removing the screen. A round head rivet 33 is mounted upon the lower end of the body portion 29 of the clip and is engageable with the bottom of the glass run 17, being yieldably held in locking engagement therewith. From the foregoing it will be apparent that the clips 26 can readily be retracted to release the window screen from the glass run, and during operation function to hold the screen in position.

As seen in Figure 5, the bottom 24 of the plastic frame 19 is formed of a thicker section than the balance of the frame, and has a groove 34 in its lower face adapted to receive the upper edge of the window glass 16. With the window glass seated within the groove 34 the bottom of the screen frame is effectively held against lateral displacement. Another advantage of this construction is that it is not necessary when inserting the screen in the window opening to take the pains necessary to position the screen in its uppermost location in the glass run, since when the window glass 16 is raised the latter will engage the lower edge of the screen frame and force the latter upwardly into its proper position.

It will be noted that the window screen 11 is exactly symmetrical about a vertical longitudinal central plane of the screen, therefore making it interchangeable between the corresponding windows on opposite sides of the vehicle. Thus, a single screen can selectively be used either in the left or right window, or if screens are provided for each window, either screen will fit either window.

Various methods of manufacture are available for forming the screen frame and for installing the screen material therein. The top 21 and sides 22 and 23 can be formed with a groove 35 part way therethrough to receive the screen material and a slot 36 can be cut completely through the bottom 24 and the dividing strip 25 to enable the screen material to be inserted through the slot, after which it can be cemented in place. Another possible arrangement is shown in Figure 8, in which the screen frame 41 is formed of two sections 42 and 43 each provided with a rabbet 44 to form a groove in the frame when the sections are assembled together. In this construction the frame sections and the screen material can be suitably cemented together. Still another method of manufacturing the window screen is to extrude the top and sides in one piece, and to form the bottom as a separate extruded section. The extruded sections are formed with the necessary grooves for receiving the screen material, and after the screen material has been inserted therein, the sections may be suitably cemented together. It will thus be seen that the screen readily lends itself to various methods of manufacture, and can be produced inexpensively.

It will be understood that the invention is not to be limited to the exact construction shown and described, but that various changes and modifications may be made without departing from the spirit and scope of the invention, as defined in the appended claim.

What is claimed is:

In a window screen for insertion in a window opening of a vehicle body in which a window glass is slideably mounted in glass runs carried by the vehicle body adjacent the periphery of the window opening, a continuous one piece plastic frame, the top and sides of the frame having a thickness suitable for sliding engagement with said glass runs, the width of said plastic frame being greater than the width of the window opening but the height of the plastic frame being less than the height of the window opening, the top and bottom portions of said plastic frame being resilient and bendable for insertion into the glass runs at the sides of the window opening, the bottom portion of said plastic frame having a thickness substantially greater than the thickness of the top and sides of the frame and having a groove formed in its lower surface snugly fitting over the upper edge of the window glass whereby the window glass supports the window screen against lateral movement, the top and sides of the plastic frame having inwardly opening slots extending only partially through the frame and the bottom portion of the frame having a slot extending completely therethrough for receiving the screen material through the slot in the bottom of the frame and into the slots in the top and sides of the frame, and a pair of metallic clips mounted upon opposite sides of said plastic frame adjacent the bottom thereof, each of said clips having a U-shaped attaching portion secured to the side of the frame, a U-shaped operating portion spaced from said U-shaped attaching portion and slideably embracing the side of the plastic frame, and a resilient connectiong portion extending between said U-shaped attaching portion and said U-shaped operating portion and yieldably engaging the bottom of the adjacent glass run to support the window screen in the opening against displacement when the window glass is opened an additional amount, and outwardly extending tabs formed upon the U-shaped operating portion of each clip for manual operation to release the clips from engagement with the glass run.

STEPHEN J. GALLA.

REFERENCES CITED

The following references are of record in the file of this patent:

UNITED STATES PATENTS

| Number | Name | Date |
|---|---|---|
| 698,926 | Fowler | Apr. 29, 1902 |
| 982,226 | Good | Jan. 17, 1911 |
| 1,061,128 | Rodwick | May 16, 1913 |
| 1,065,303 | Dyer | June 17, 1913 |
| 1,117,941 | Boykin | Nov. 17, 1914 |
| 1,120,389 | Jeeve | Dec. 8, 1914 |
| 1,351,733 | Barker | Sept. 7, 1920 |
| 1,643,939 | Becker | Oct. 4, 1927 |
| 1,753,866 | McCormack | Apr. 8, 1930 |
| 1,854,138 | Hicks | Apr. 12, 1932 |
| 2,255,725 | Trescher | Sept. 9, 1941 |
| 2,307,477 | Wilber | Jan. 5, 1943 |